(12) United States Patent
Oh

(10) Patent No.: US 11,720,389 B2
(45) Date of Patent: Aug. 8, 2023

(54) STORAGE SYSTEM CONFIGURING A STORAGE POOL ACCORDING TO SHARED INFORMATION, STORAGE DEVICE THEREFOR, AND OPERATING METHOD THEREOF

(71) Applicant: SK hynix Inc., Icheon (KR)

(72) Inventor: Tae Jin Oh, Icheon (KR)

(73) Assignee: SK hynix Inc., Icheon (KR)

( * ) Notice: Subject to any disclaimer, the term of this patent is extended or adjusted under 35 U.S.C. 154(b) by 144 days.

(21) Appl. No.: 16/996,632

(22) Filed: Aug. 18, 2020

(65) Prior Publication Data

US 2021/0311767 A1 Oct. 7, 2021

(30) Foreign Application Priority Data

Apr. 7, 2020 (KR) .................. 10-2020-0042028

(51) Int. Cl.
| | |
|---|---|
| *G06F 9/455* | (2018.01) |
| *G06F 9/50* | (2006.01) |
| *G06F 3/06* | (2006.01) |
| *H04L 49/00* | (2022.01) |

(52) U.S. Cl.
CPC ........ *G06F 9/45558* (2013.01); *G06F 3/0604* (2013.01); *G06F 3/0644* (2013.01); *G06F 3/0683* (2013.01); *G06F 9/5016* (2013.01); *H04L 49/70* (2013.01); *G06F 2009/45583* (2013.01); *G06F 2009/45595* (2013.01)

(58) Field of Classification Search
CPC .. G06F 9/45558; G06F 3/0604; G06F 3/0644; G06F 3/0683; G06F 9/5016; G06F 2009/45583; G06F 2009/45595; H04L 49/70
See application file for complete search history.

(56) References Cited

U.S. PATENT DOCUMENTS

| | | | | |
|---|---|---|---|---|
| 8,645,659 | B1 * | 2/2014 | Winokur | G06F 3/0689 711/170 |
| 10,708,356 | B2 * | 7/2020 | Wang | G06F 3/0644 |
| 2010/0082900 | A1 * | 4/2010 | Murayama | G06F 3/0608 711/E12.001 |
| 2012/0030306 | A1 * | 2/2012 | Kami | G06F 9/5077 709/213 |

(Continued)

FOREIGN PATENT DOCUMENTS

| | | |
|---|---|---|
| KR | 20120097136 A | 9/2012 |
| KR | 201801 11492 A | 10/2018 |

*Primary Examiner* — Jorge A Chu Joy-Davila

(57) ABSTRACT

A storage system includes a plurality of storage devices coupled to at least one host through a network and configured to form a virtual network of virtual machines generated when the plurality of storage devices are coupled to the network, wherein each of the plurality of storage devices allocates memory resources to the virtual machines and shares device information for the plurality of storage devices through the virtual machines and wherein the host: selects from the plurality of storage devices a main storage device, and transmits a storage pool generation condition to the main storage device that identifies a number of storage pools and a capacity of each storage pool, wherein the main storage device generates at least one storage pool that satisfies the storage pool generation condition using the memory resources allocated to each of the virtual machines.

20 Claims, 10 Drawing Sheets

(56) References Cited

U.S. PATENT DOCUMENTS

| | | | |
|---|---|---|---|
| 2012/0133520 A1* | 5/2012 | Chang | G06F 13/409 |
| | | | 710/110 |
| 2013/0111221 A1* | 5/2013 | Fujii | G06F 21/72 |
| | | | 713/193 |
| 2016/0224437 A1* | 8/2016 | Nelogal | G06F 11/1469 |
| 2017/0262214 A1 | 9/2017 | Venkatesh et al. | |
| 2018/0336046 A1* | 11/2018 | Miyauchi | G06F 9/44505 |

* cited by examiner

STORAGE SYSTEM CONFIGURING A STORAGE POOL ACCORDING TO SHARED INFORMATION, STORAGE DEVICE THEREFOR, AND OPERATING METHOD THEREOF

CROSS-REFERENCES TO RELATED APPLICATION

The present application claims priority under 35 U.S.C. § 119(a) to Korean Patent Application Number 10-2020-0042028, filed on Apr. 7, 2020, in the Korean Intellectual Property Office, which is incorporated herein by reference in its entirety.

BACKGROUND

1. Technical Field

Various embodiments may generally relate to a data processing system, and more particularly, to a storage system, a storage device therefor, and an operating method thereof.

2. Related Art

Nonvolatile memory express (NVMe) is an NVM-dedicated protocol that uses a physical interface of peripheral component interconnect express (PCIe).

NVMe-over fabric (NVMe-oF) is technology that can connect hundreds or thousands of NVMe standard storage devices to each other through fabric networks such as Ethernet, a fiber channel, InfiniBand, and so on.

As demands for memory-centric computing apparatuses and systems for processing big data increase, the need increases for more or additional computing resources, high bandwidth networks, and high-performance and high-capacity storage devices.

Various studies have been conducted seeking to minimize the burden on a host, such as to minimize the movement of data between a storage device and the host by offloading operation processing to the storage device from the host in memory-centric computing devices.

SUMMARY

In an embodiment of the present disclosure, a storage system may include a plurality of storage devices coupled to at least one host through a network and configured to form a virtual network of virtual machines generated when the plurality of storage devices are coupled to the network, wherein each of the plurality of storage devices allocates memory resources to the virtual machines and shares device information for the plurality of storage devices through the virtual machines and wherein the host: selects from the plurality of storage devices a main storage device, and transmits a storage pool generation condition to the main storage device that identifies a number of storage pools and a capacity of each storage pool, wherein the main storage device generates at least one storage pool that satisfies the storage pool generation condition using the memory resources allocated to each of the virtual machines.

In an embodiment of the present disclosure, a storage device which is coupled to at least one host through a network may include: a data storage device configured to write and read data according to control of the controller; wherein the controller includes: a network interface configured to couple the storage device to the network and communicate with the at least one host; a converter configured to perform conversion between a communication protocol of the network interface and a communication protocol of the storage device; a storage interface configured to provide a communication channel between the controller and the data storage device; and a storage virtualizer configured to: allocate a memory resource to at least one virtual machine that is generated as the storage device is coupled to the network; share device information of the plurality of storage devices through the at least one virtual machine; and generate at least one storage pool that satisfies a number of storage pools and capacity for each storage pool requested by the at least one host using the memory resource allocated to the at least one virtual machine.

In an embodiment of the present disclosure, an operating method of a storage system including a plurality of storage devices that are coupled to at least one host through a network, the method comprising: generating at least one virtual machine when the plurality of storage devices are coupled to the network via each of the plurality of storage devices, wherein the plurality of storage devices form a virtual network of the virtual machines; allocating a memory resource to the at least one virtual machine via each of the plurality of storage devices; sharing device information of other storage devices through the virtual machines via each of the plurality of storage devices; and selecting, via the host, from the plurality of storage devices a main storage device; and transmitting a storage pool generation condition to the main storage device that identifies a number of storage pools and a capacity of each storage pool, wherein the main storage device generates at least one storage pool that satisfies the storage pool generation condition using the memory resource allocated to the at least one virtual machine.

These and other features, aspects, and embodiments are described in more detail below.

BRIEF DESCRIPTION OF THE DRAWINGS

The above description and other aspects, features and advantages of the subject matter of the present disclosure will be more clearly understood from the following detailed description taken in conjunction with the accompanying drawings, in which.

DETAILED DESCRIPTION

Various embodiments of the present teachings are described in detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present teachings as defined in the appended claims.

The present teachings are described herein with reference to cross-section and/or plan illustrations of idealized embodiments of the present teachings. However, embodiments of the present teachings should not be construed as limiting the present teachings. Although a few embodiments of the present teachings are shown and described, it will be appreciated by those of ordinary skill in the art that changes may be made in these embodiments without departing from the principles and spirit of the present teachings.

Figure 1:
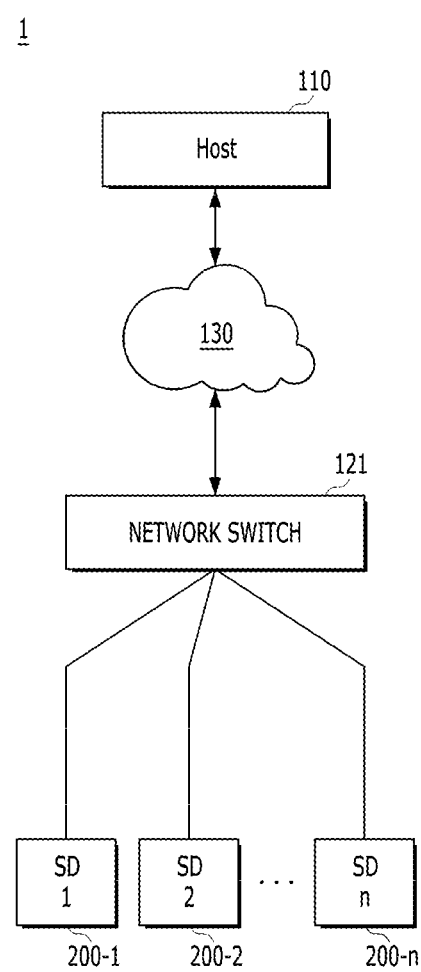
FIGS. 1 to 3 are diagrams illustrating configurations of storage systems according to embodiments of the present disclosure.
Figure 2:
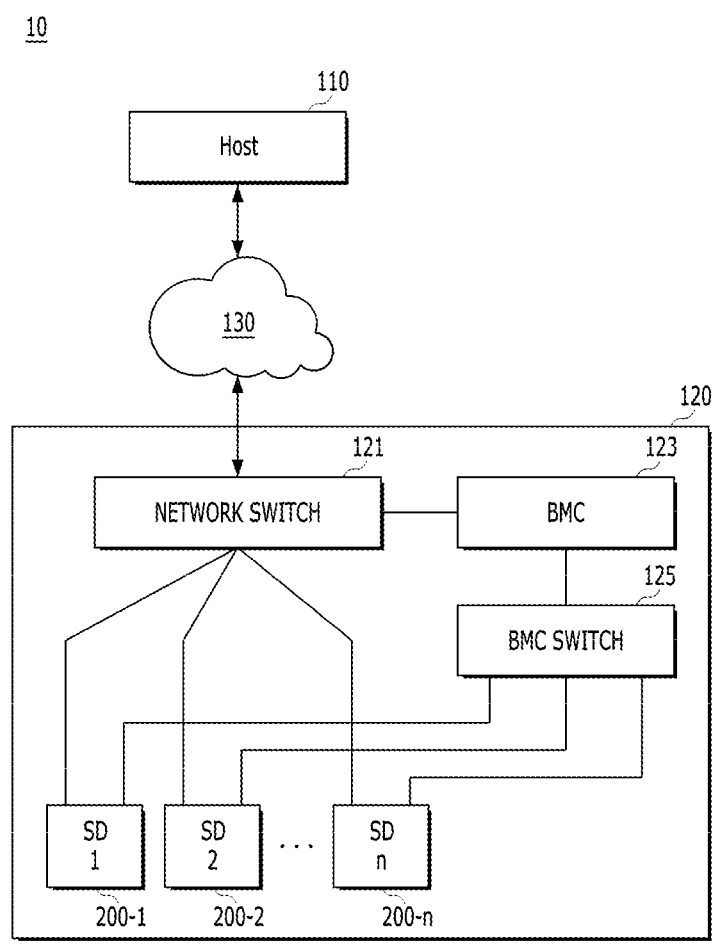
Figure 3:
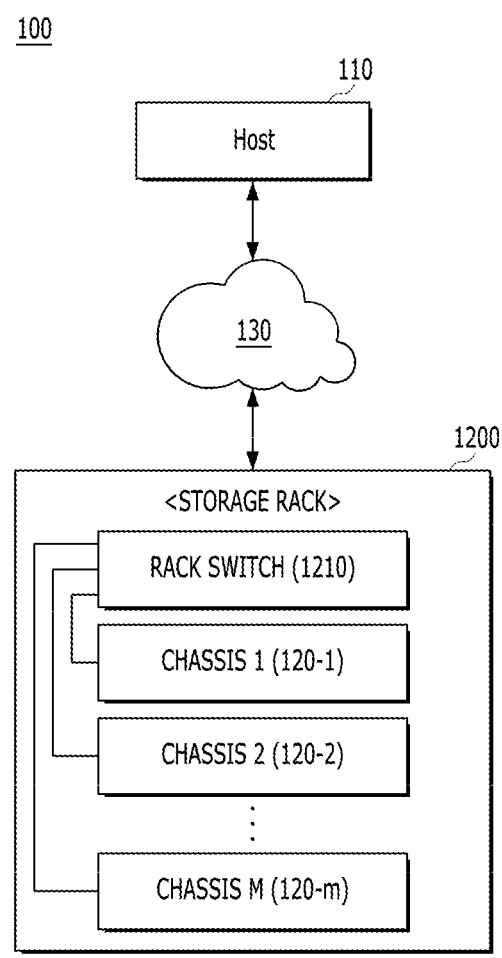

FIGS. 1 to 3 are diagrams illustrating configurations of storage systems according to embodiments.

Referring to FIG. 1, a storage system 1 may include at least one host 110 and a plurality of storage devices (SD1 to SDn) 200-1 to 200-n coupled to the at least one host 110 through a network 130.

The network 130 may be a fabric network, such as Ethernet, a fiber channel, InfiniBand, and so on.

The storage devices 200-1 to 200-n may be a solid state drive (SSD), for example, Ethernet-SSD (eSSD).

The at least one host 110 may set NVMe-oF connections with the storage devices 200-1 to 200-n.

A network switch 121 may provide an environment where the plurality of storage devices 200-1 to 200-n can be coupled to the at least one host 110 through the network 130. The network switch 121 may store addresses for identifying the storage devices 200-1 to 200-n in an internal memory (not shown), and allow each host 110 to perform data exchange with a specific storage device of the storage devices 200-1 to 200-n.

The network switch 121 may communicate with the host 110 through an uplink port at a first speed and communicate with the plurality of storage devices 200-1 to 200-n through a downlink port at a second speed.

The plurality of storage devices 200-1 to 200-n may provide high-performance and high-capacity data storage solutions. The NVMe-oF protocol may allow an application, which is driven in or by the host 110, to be offloaded to and processed in the plurality of storage devices 200-1 to 200-n in a remote direct-attached storage (rDAS) manner.

Referring to FIG. 2, a storage system 10 according to an embodiment may include at least one host 110 and a storage chassis 120 coupled to the at least one host 110 through a network 130.

The network 130 may be a fabric network, such as Ethernet, a fiber channel, InfiniBand, and so on.

The storage chassis 120 may include a plurality of storage devices (SD1 to SDn) 200-1 to 200-n. In an embodiment, the storage devices 200-1 to 200-n may be a solid state drive (SSD), for example, Ethernet-SSD (eSSD).

The at least one host 110 may set NVMe-oF connections with the storage devices 200-1 to 200-n in the storage chassis 120.

The storage chassis 120 may further include a network switch 121, a baseboard management controller (BMC) 123, a BMC switch 125, and the plurality of storage devices 200-1 to 200-n, which are coupled or mounted to a motherboard or a baseboard.

The network switch 121 may provide an environment where the plurality of storage devices 200-1 to 200-n can be coupled to the at least one host 110 through the network 130. The network switch 121 may stores identifiers (IDs) or addresses for identifying each of the storage devices 200-1 to 200-n in an internal memory (not shown), and allow each host 110 to perform data exchange with a specific storage device among the storage devices 200-1 to 200-n.

The network switch 121 may communicate with the host 110 through an uplink port at a first speed and communicate with the plurality of storage devices 200-1 to 200-n through a downlink port at a second speed.

The BMC 123 may be coupled to the network switch 121 and configured to manage inner elements in or of the storage chassis 120. For example, the BMC 123 may manage the plurality of storage devices 200-1 to 200-n and the network switch 121. In an embodiment, the BMC 123 may set boot and control paths by setting the plurality of storage devices 200-1 to 200-n and the network switch 121 according to a command provided by a system administrator. The BMC 123 may check hardware health information, such as a connection state, lifespan, temperature, and log information of the plurality of storage devices 200-1 to 200-n, and/or power consumption information.

The BMC switch 125 may provide an environment where the plurality of storage devices 200-1 to 200-n and the BMC 123 can be connected to each other. In an embodiment, the BMC switch 125 may include a peripheral component interconnect express (PCIe) switch.

The plurality of storage devices 200-1 to 200-n, the network switch 121, which couples the plurality of storage devices 200-1 to 200-n and the host 110, and the BMC 123, which manages the plurality of storage devices 200-1 to 200-n and the network switch 121, may be installed together in a chassis or an enclosure that forms the storage chassis 120.

The plurality of storage devices 200-1 to 200-n may provide high-performance and high-capacity data storage solutions. The NVMe-oF protocol may allow an application, which is driven in the host 110, to be offloaded to and processed in the plurality of storage devices 200-1 to 200-n in a remote direct-attached storage (rDAS) manner.

Referring to FIG. 3, a storage system 100 according to an embodiment may include at least one host 110 and a storage rack 1200 coupled to the at least one host 110 through a network 130.

The storage rack 1200 may include a rack switch 1210 and a plurality of storage chassis 120-1 to 120-m.

The rack switch 1210 may be configured to provide connection between the plurality of storage chassis 120-1 to 120-m.

Each of the storage chassis 120-1 to 120-m may have a configuration where a plurality of storage devices, such as eSSDs, are coupled to or mounted on a motherboard with a network switch and a BMC.

In an embodiment, each of the plurality of storage chassis 120-1 to 120-*m* may be configured similar to the storage chassis 120 illustrated in FIG. 2.

The storage devices 200-1 to 200-*n* of the storage systems 1, 10, and/or 100 of FIGS. 1 to 3 may be configured to share device information of the plurality of storage devices 200-1 to 200-*n* to each other, and/or may be part of storage pools independent of the host 110 and without intervention from the host 110.

In an embodiment, each of the plurality of storage devices 200-1 to 200-*n* may broadcast its device information through various methods when the plurality of storage devices 200-1 to 200-*n* are employed in the storage systems 1, 10, and/or 100. The device information may be information collected by the storage devices 200-1 to 200-*n* by monitoring hardware information (e.g., physical information) and software information (e.g., logical information) of the storage devices 200-1 to 200-*n*. The hardware information may include one or more of total storage capacity information, remaining storage capacity information, information identifying the number of bad blocks, temperature information, lifespan information, and so on. The software information may include one or more of a busy degree, the number of requests being processed or being in a standby state, a frequently requested request pattern, a read-requested data pattern, and so on.

In an embodiment, the device information may be shared using or via a broadcasting and inquiry method.

In the broadcasting and inquiry method, when the storage devices 200-1 to 200-*n* are employed in the storage system 1, 10, and/or 100, each of the storage devices 200-1 to 200-*n* may transmit (e.g., broadcast) associated device information to the other storage devices of the storage devices 200-1 to 200-*n*. Each of the storage devices 200-1 to 200-*n* that receives the device information of the other storage devices may then store the received device information within the device.

In an embodiment, when the storage devices 200-1 to 200-*n* are employed in the storage system 10 or 100, the storage devices 200-1 to 200-*n* may transmit (e.g., broadcast) device information to the BMC 123, and the BMC 123 may store the device information for the storage devices 200-1 to 200-*n* internally. A main storage device may be part of a storage pool based on the device information stored in the BMC 123 and a storage pool generation condition required or requested by the host 110.

Each of the storage devices 200-1 to 200-*n* may transmit changed device information associated with a device to the other storage devices or the BMC 123, so that the shared device information stored in the other storage devices or the BMC 123 is updated when a variation of the device information of the storage device is equal to or more than a set threshold value. The main storage device may change a configuration of the storage pool by reflecting the latest states of the storage devices 200-1 to 200-*n*.

At least one of the plurality of storage devices 200-1 to 200-*n* may be selected as the main storage device by the host 110 and, thus, the plurality of storage devices 200-1 to 200-*n* may include at least one main storage device and other sub storage devices.

The main storage device may include memory resources for the plurality of storage devices 200-1 to 200-*n*, which are employed in the storage system 1, 10 or 100, as at least one storage pool, based on the storage pool generation condition transmitted from the host 110, the associated device information and the device information of the sub storage devices. In an embodiment, the storage pool generation condition may include the number of storage pools and/or capacity of the storage pool.

The storage devices 200-1 to 200-*n* may communicate with each other through a virtual network within the storage pool, and the main storage device and the sub storage devices may cooperate and/or communicate with each other on the virtual network to process requests received from the host 110.

The virtual network may be an abstraction of hardware resources to software. The phrase "virtualization or abstraction of a network" may include an execution of software, which performs emulation similar to direct access to physical hardware of an actual network on hardware. The virtual network may include at least one virtual system connected to the at least one physical network switch 121 through a virtual network switch. The virtual network switch may be a software network switch, which operates in the same manner as the physical network switch 121.

The main storage device may constitute a virtual system including at least one storage pool where the hardware resources included in the plurality of storage devices 200-1 to 200-*n* are abstracted. Accordingly, the host 110 may communicate with the at least one storage pool through the main storage device, and the plurality of storage devices 200-1 to 200-*n* of the storage pool may communicate with each other through the virtual network.

In an embodiment, the host 110 may transmit a request to write data to the main storage device and/or read data from the main storage device, and in response to the request received from the host, the main storage device may write data to or read data from the main storage device, or may write or read data in mutual cooperation with the sub storage devices through the virtual network.

In an embodiment, the plurality of storage devices 200-1 to 200-*n* may distribute data between devices. Among the plurality of storage devices 200-1 to 200-*n*, a storage device that needs or requests the data distribution may be referred to as a "source storage device," and a storage device that receives and stores distribution target data from the source storage device may be referred to as a "target storage device."

Any storage device among the plurality of storage devices 200-1 to 200-*n* may be the source storage device, and the source storage device may select at least one target storage device based on device information for the remaining storage devices, other than the source storage device, and may distribute the distribution target data to the selected target storage device.

In an embodiment, the source storage device may transmit the distribution target data, which is data selected according to a set criterion, to the target storage device, and the target storage device may store the distribution target data transmitted from the source storage device. Therefore, the distribution target data of the source storage device may be distributed to and stored in the target storage device. In an embodiment, the source storage device may divide the distribution target data into a plurality of pieces or portions of distribution target data and distribute and store the plurality of pieces or portions of distribution target data to and in a plurality of target storage devices.

Figure 4:
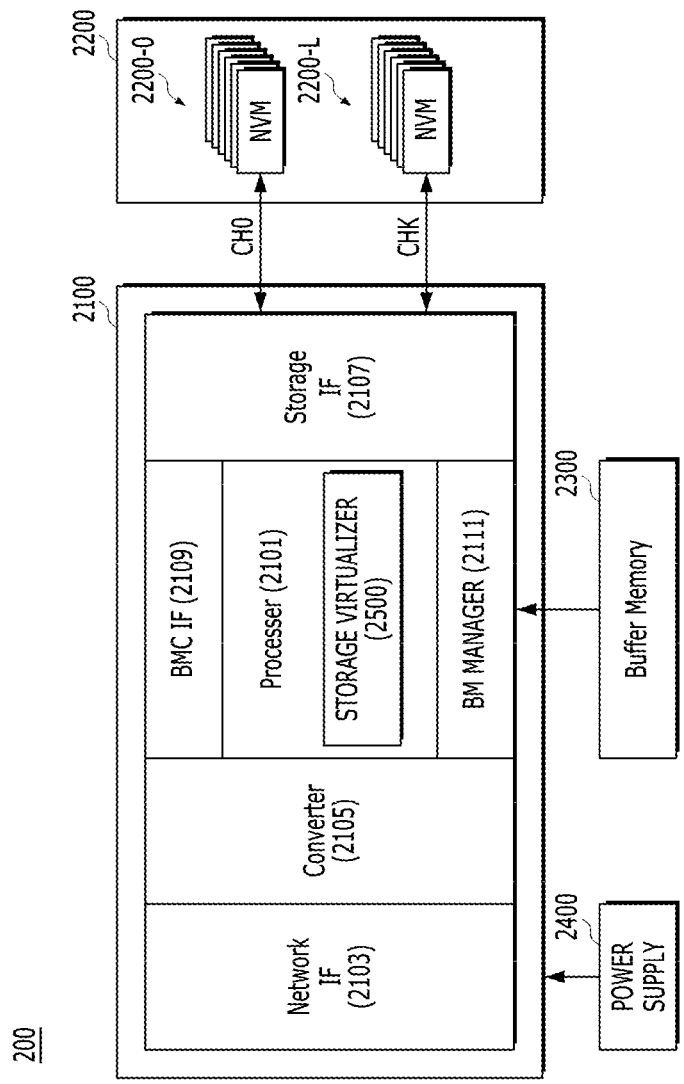
FIG. 4 is a diagram illustrating a configuration of a storage device according to an embodiment of the present disclosure.

FIG. 4 is a diagram illustrating a configuration of a storage device according to an embodiment.

Referring to FIG. 4, the storage device 200 according to an embodiment may include a controller 2100, a data storage device 2200, a buffer memory 2300, and a power supply

2400. The data storage device 2200 may include a plurality of nonvolatile memory devices (NVMs) 2200-0 to 2200-L, L being a positive integer.

The controller 2100 may analyze and process a signal input from the host 110 or other storage devices. The controller 2100 may operate according to firmware or software for driving the data storage device 2200. In an embodiment, the controller 2100 is a digital circuit that manages the flow of data going to and from the data storage device 2200. The controller may be formed on a chip independently or integrated with one or more other circuits.

In an embodiment, the controller 2100 may perform a function of a flash translation layer (FTL), which performs garbage collection, address mapping, ware leveling, and so on for managing the data storage device 2200, a function that detects and corrects errors of data read out from the data storage device 2200, and so on.

The buffer memory 2300 may temporarily store data to be stored in the data storage device 2200. The buffer memory 2300 may also temporarily store data read out from the data storage device 2200. The data temporarily stored in the buffer memory 2300 may be transmitted to the host 110, the data storage device 2200, or another storage device according to control of the controller 2100. The buffer memory 2300 may be included inside the controller 2100.

The nonvolatile memory devices 2200-0 to 2200-L may be used as storage media of the storage device 200. The nonvolatile memory devices 2200-0 to 2200-L may be coupled to the controller 2100 through a plurality of channels CH0 to CHK. One or more nonvolatile memory devices may be coupled to one channel. The nonvolatile memory devices coupled to the same channel may be coupled to the same signal bus, or the same data bus, or both.

The power supply 2400 may provide power input through a power connector to the controller 2100, the nonvolatile memory device 2200-0 to 2200-L, and the buffer memory 2300. The power supply 2400 may further include a subsidiary power supply configured to supply power to the storage device 200, so that the storage device 200 is terminated in a normal fashion when sudden power off (SPO) occurs.

In an embodiment, the controller 2100 may include a processor 2101, a network interface (IF) 2103, a converter 2105, a storage interface (IF) 2107, a BMC interface (IF) 2109, and a buffer memory (BM) manager 2111. The BMC interface 2109 may be omitted according to different implementation types of the storage systems 1, 10, and/or 100.

The processor 2101 may be configured as a combination of hardware and software executed on the hardware, and configured to drive the software or firmware loaded to operate the storage device 200.

The network interface 2103 may provide a communication channel between the storage device 200 and the network 130 through the network switch 121 to communicate with the host 110.

The converter 2105 may be configured to perform conversion between a communication protocol of the network interface 2103, which couples the storage device 200 to the network 130, and a communication protocol of the inside of the storage device 200.

The storage interface 2107 may provide a communication channel for signal exchange between the controller 2100 and the data storage device 2200. The storage interface 2107 may write data temporarily stored in the buffer memory 2300 into the data storage device 2200 according to control of the processor 2101. The storage interface 2107 may transmit data read out from the data storage device 2200 to the buffer memory 2300 so that the read data is temporarily stored in the buffer memory 2300.

The BMC interface 2109 may provide a communication channel between the storage device 200 and the BMC 123 through the BMC switch 125. In an embodiment, the BMC interface 2109 may be a PCIe interface.

The BM manager 2111 may be configured to manage a usage state of the buffer memory 2300. In an embodiment, the BM manager 2111 may divide the buffer memory 2300 into a plurality of regions (slots) and allocate or release the regions in order to temporarily store data.

The processor 2101 may include a storage virtualizer 2500.

In an embodiment, the storage virtualizer 2500 may register an ID and a physical address of the storage device 200, including the storage virtualizer 2500, in the network switch 121 and the host 110 when the storage device 200 is employed in the storage system 1, 10, or 100.

Further, the storage virtualizer 2500 may execute at least one virtual machine, and be part of the virtual network with the storage devices 200-1 to 200-$n$ employed in the storage system 1, 10, or 100 through the at least one virtual machine.

Virtual addresses may be allocated to the virtual machines so that the storage devices 200 may be identified by the virtual addresses on the virtual network formed by the storage devices 200. The storage devices 200 may broadcast the device information through the virtual network so that the storage devices 200 may share the device information with each other.

Further, partial regions of the nonvolatile memory devices 2200-0 to 2200-L may be allocated to the virtual machines as a memory resource or resources.

In an embodiment, the execution of the virtual machine, the allocation of the virtual address, and so on may be performed by a virtual machine manager called a hypervisor.

When the storage device 200 is designated as the main storage device by the host 110, the storage virtualizer 2500 may be part of a storage pool based on the storage pool generation condition transmitted from the host 110 and the share device information. The storage pool may include at least one storage device of the storage devices 200-1 to 200-$n$ or at least one data storage device 2200 in the at least one storage devices 2200-1 to 2200-$n$.

In an embodiment, a number or amount of virtual machines corresponding to the number of storage pools required or requested by the host 110 may be generated in the storage device 200 according to control of the main storage device. The same ID may be allocated to the virtual machines of the same storage pool, and the virtual machines may be identified by unique virtual addresses allocated by the hypervisor. At least partial regions of the nonvolatile memory devices 2200-0 to 2200-L may be allocated to each of the virtual machines as the memory resource. Accordingly, each of the virtual machines may be managed through virtual machine information, including a virtual machine ID, a unique virtual address, and a capacity for the ID of the memory resource (for example, nonvolatile memory devices 2200-0 to 2200-L) allocated into the virtual machine.

When the storage pool is established, the main storage device may transmit storage pool cgeneration information to the host 110. In an embodiment, the storage pool generation information may include a storage pool ID, a virtual machine ID for the storage pool, a virtual address of the virtual machine included in the storage pool, and an ID and capacity of the memory resource (for example, the nonvolatile memory devices 2200-0 to 2200-L).

The ID and physical address of the main storage device may be mapped to the storage pool ID, the virtual machine ID representing the storage pool, and the virtual address of the virtual machine generated in the main storage device and then registered in the network switch 121.

The host 110 may identify the storage pool based on the storage pool ID and the virtual addresses of the virtual machines generated in the main storage device. Further, the host 110 may transmit a request for accessing a desired storage pool through the network switch 121 based on the physical address of the main storage device. In an embodiment, the storage pool ID and the virtual machine ID may be the same as or different from each other.

In an embodiment, a new storage device may be added to the storage system 1, 10, or 100. The main storage device may request that the added storage device generates at least one virtual machine (e.g., virtual machines larger than the number of storage pools) so that the configuration of the storage pool may be changed. In an embodiment, the added storage device may not be incorporated into the storage pool and may be managed in a standby state.

Figure 5:
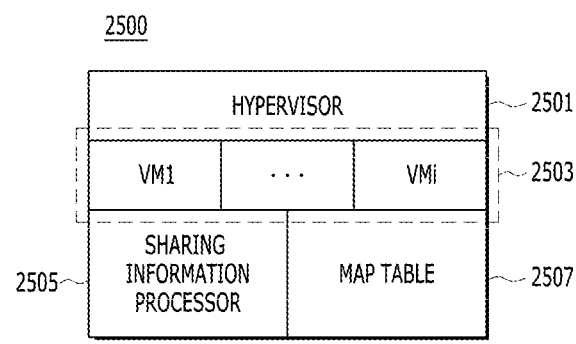
FIG. 5 is a diagram illustrating a configuration of a storage virtualizer according to an embodiment of the present disclosure.

FIG. 5 is a diagram illustrating a configuration of a storage virtualizer according to an embodiment.

Referring to FIG. 5, the storage virtualizer 2500 according to an embodiment may include a hypervisor 2501, at least one virtual machine 2503, a sharing information processor 2505, and a map table 2507.

The hypervisor 2501 may generate at least one virtual machine VM1 to VMi in response to a request received from the host 110 or the main storage device, and allocate the virtual addresses to the virtual machines VM1 to VMi. The at least partial regions of the nonvolatile memory devices 2200-0 to 2200-L may be allocated into the generated virtual machines VM1 to VMi as memory resources. The storage devices 200 may be part of the virtual network based on the virtual machines VM1 to VMi and the virtual addresses allocated to the virtual machines VM1 to VMi.

Because the storage device 200 is coupled to the virtual network through the at least one virtual machine, the sharing information processor 2505 may broadcast the associated device information and receive and store the device information of the other storage devices therein.

The device information may include hardware information (e.g., physical information) and software information (e.g., logical information) of the storage device 200.

The map table 2507 may store the IDs and the physical addresses of the nonvolatile memory devices 2200-0 to 2200-L allocated to the virtual machines VM1 to VMi.

When the storage device 200 is designated as the main storage device, the hypervisor 2501 may generate or establish the storage pool based on the storage pool generation condition transmitted from the host 110, the information of the virtual machines VM1 to VMi, and the device information managed through the sharing information processor 2505, and transmit the storage pool generation information to the host 110.

Accordingly, physical access information corresponding to a logical address of data to be stored in the storage pool may be stored in the map table 2507 of the main storage device in response to the request received from the host. The physical access information may include, for example, the physical address of the nonvolatile memory device 2200-0 to 2200-L in which the data is stored, the virtual address of the virtual machine including the nonvolatile memory device 2200-0 to 2200-L as the memory resource, the storage pool ID including the corresponding virtual machine, or other access information.

The hypervisor 2501 may transmit a read or write request to the data storage device 2200 or another storage device 200 by referring to the map table 2507 in response to receiving the request from the host 110 or the main storage device.

Figure 6:
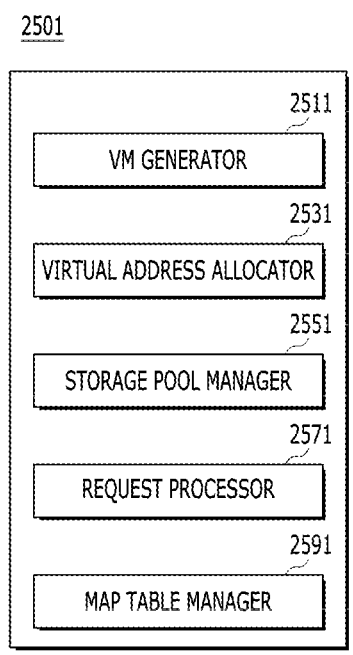
FIG. 6 is a diagram illustrating a configuration of a hyperviser according to an embodiment of the present disclosure.

FIG. 6 is a diagram illustrating a configuration of the hypervisor 2501 according to an embodiment.

Referring to FIG. 6, the hypervisor 2501 according to an embodiment may include a virtual machine (VM) generator 2511, a virtual address allocator 2531, a storage pool manager 2551, a request processor 2571, and a map table manager 2591.

The VM generator 2511 may generate the at least one virtual machine VM1 to VMi in response to the request received from the host 110 or the main storage device, and allocate at least partial regions of the nonvolatile memory devices 2200-0 to 2200-L to the generated virtual machine VM1 to VMi as a memory resource. The capacity of the memory resource allocated to the virtual machine VM1 to VMi may be determined by the main storage device, or may be determined by other components.

The virtual address allocator 2531 may allocate a unique virtual address to each virtual machine VM1 to VMi generated by the VM generator 2511.

Accordingly, the plurality of storage devices employed in or by the storage system 1, 10, or 100 may form the virtual network through the virtual machines executed therein and may be mutually identified through the associated virtual addresses.

The storage pool manager 2551 may establish or generate the storage pool based on the storage pool generation condition transmitted from the host 110, information of the virtual machine VM1 to VMi, and the device information received from the sharing information processor 2505. In an embodiment, the storage pool generation condition may include the number of storage pools and capacity of the storage pool. The information of the virtual machine VM1 to VMi may include a virtual machine ID, a virtual address, and capacity and a physical address of the nonvolatile memory device 2200-0 to 2200-L allocated to the virtual machine VM1 to VMi.

When the storage pool is generated or established, the storage pool manager 2551 may transmit storage pool generation information to the host 110. In an embodiment, the storage pool generation information may include a storage pool ID, a virtual machine ID for the storage pool, a virtual address of the virtual machine included in the storage pool, and an ID, capacity, and a physical address of the nonvolatile memory device 2200-0 to 2200-L generating the storage pool. The ID and physical address of the main storage device may be mapped to the storage pool ID, the virtual machine ID generating the storage pool, and the virtual addresses of the virtual machines generated in the main storage device and then registered in the network switch 121. The host 110 may identify the storage pool based on the storage pool ID and the virtual address of the virtual machine generated in the main storage device and communicate with the storage pool through the network switch 121.

The request processor 2571 may write or read data by accessing the nonvolatile memory devices 2200-0 to 2200-L or the storage device 200 representing the storage pool by referring to the map table 2507 in response to the request transmitted from the host 110 or the main storage device.

The map table manager 2591 may store the IDs and the physical addresses of the nonvolatile memory devices 2200-0 to 2200-L allocated to the virtual machines VM1 to VMi. As the storage device is determined as the main storage device by the host 110, the map table manager 2591 may store physical access information corresponding to a logical address of data write-requested by the host in the map table 2507. The physical access information may include, for example, the physical address of the nonvolatile memory device 2200-0 to 2200-L in which the data is stored, the virtual address of the virtual machine including the nonvolatile memory device 2200-0 to 2200-L as a memory resource, and the storage pool ID including the corresponding virtual machine.

Figure 7:
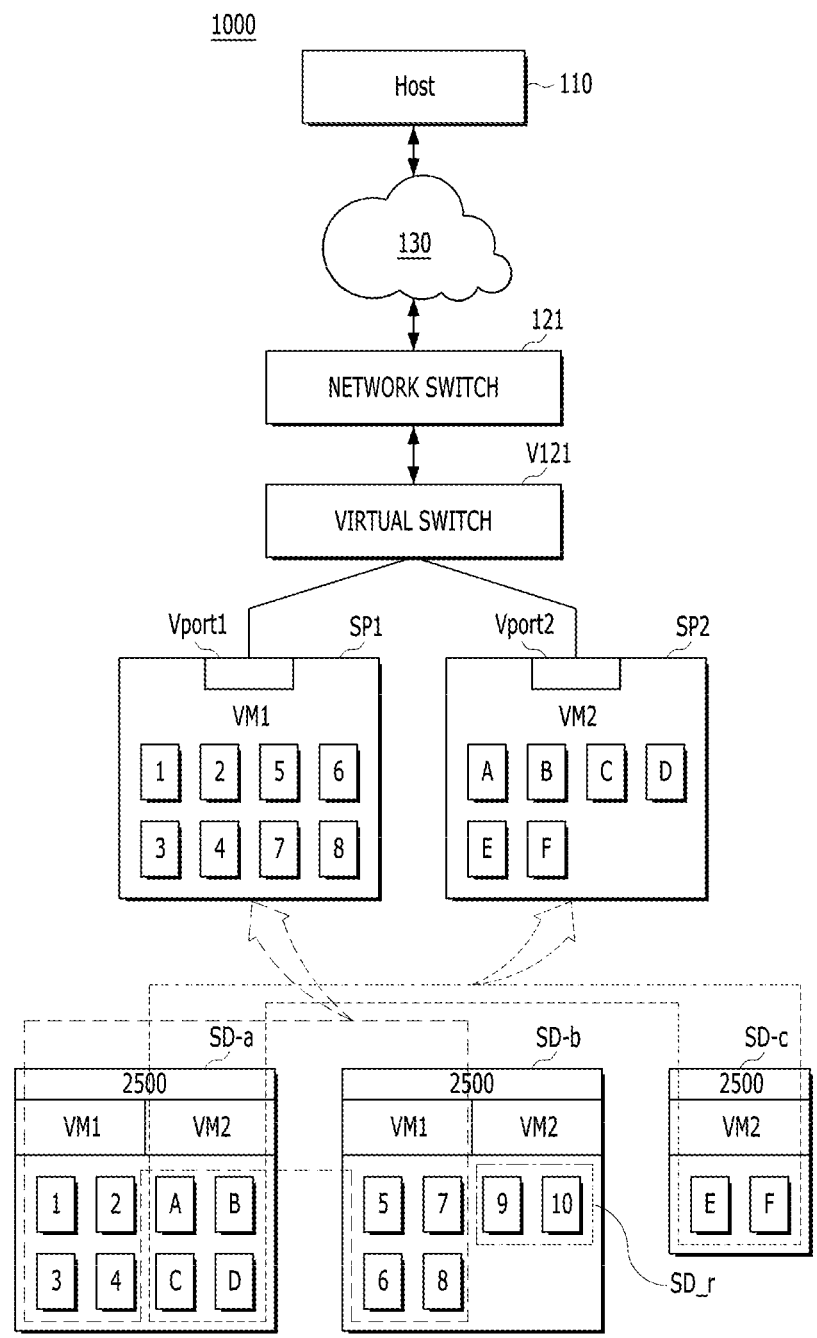
FIG. 7 is a diagram illustrating a configuration of a network system including a storage pool according to an embodiment of the present disclosure.

FIG. 7 is a diagram illustrating a configuration of a network system 1000 including a storage pool according to an embodiment.

Referring to FIG. 7, when virtual machines are generated in the network system 1000 in storage devices SD-a, SD-b, and SD-c, according to control of the storage virtualizer 2500, a virtual address and a memory resource may be allocated to each of the virtual machines.

For example, memory blocks 1, 2, 3, and 4 may be allocated as a resource to a first virtual machine VM1 of the storage device SD-a, and memory blocks A, B, C, and D may be allocated as a resource to a second virtual machine VM2 of the storage device SD-a. Memory blocks 5, 6, 7, and 8 may be allocated as a resource to a first virtual machine VM1 of the storage device SD-b, and memory blocks E and F may be allocated as a resource to a second virtual machine VM2 of the storage device SD-c.

When the storage device SD-a is determined as the main storage device, the main storage device SD-a may establish or generate a first storage pool SP1 using the memory blocks 1, 2, 3, and 4 allocated to the first virtual machine VM1 of the main storage device SD-a and the memory blocks 5, 6, 7, and 8 allocated to the first virtual machine VM1 of the storage device SD-b based on the storage pool generation condition. The main storage device SD-a may also establish a second storage pool SP2 using the memory blocks A, B, C, and D allocated to the second virtual machine VM2 of the main storage device SD-a and the memory blocks E and F allocated to the second virtual machine VM2 of the storage device SD-c based on the storage pool generation condition.

The first storage pool SP1 may be coupled to a virtual switch V121 through a virtual address allocated to the first virtual machine VM1 of the main storage device SD-a and a virtual port Vport1, and the second storage pool SP2 may be coupled to the virtual switch V121 through a virtual address allocated to the second virtual machine VM2 of the main storage device SD-a and a virtual port Vport2.

The generation information of the first and second storage pools SP1 and SP2 may be transmitted to the host 110. The generation information of each of the first and second storage pools SP1 and SP2 may include a storage pool ID, a virtual machine ID for the corresponding storage pool, the virtual address of the virtual machine included in the corresponding storage pool, and an ID, capacity, and a physical address of the nonvolatile memory device 2200-0 to 2200-L forming the corresponding storage pool.

The ID and physical address of the main storage device SD-a may be mapped to the IDs of the storage pools SP1 and SP2, the IDs of the virtual machines VM1 and VM2 forming the storage pools SP1 and SP2, and the virtual addresses of the virtual machines VM1 and VM2 generated in the main storage device SD-a and then registered in the network switch 121.

The request of the host 110 may be transmitted to the main storage device SD-a through the network switch 121. In an embodiment, the request of the host 110 may be a packet which includes a header part including destination information and a body part including a command. The destination information of the header part may include a storage pool ID and a virtual address of any one among the virtual machines generated in the main storage device. The command of the body part may include a command ID, a logical address, and data.

As the host 110 transmits a request packet to the main storage device through the network switch 121, the network interface 2103 of the main storage device may extract a storage pool ID and a virtual address from the header part of the request packet and transmit contents included in the body part to the virtual machine that is part of an extracted storage pool. The hypervisor 2501 of the storage pool, which receives the contents, may interpret the command included in the body part and execute the command by accessing a physical region corresponding to the physical address of the storage device SD-a, SD-b, or SD-c which is indicated by the logical address of the host 110 through the virtual network coupled to the virtual switch V121.

In an embodiment, a spare memory block SD-r of the storage device SD-b may be incorporated into the first or second storage pool SP1 or SP2 or may be part of a separate storage pool, as the storage pool generation condition is changed.

Figure 8:
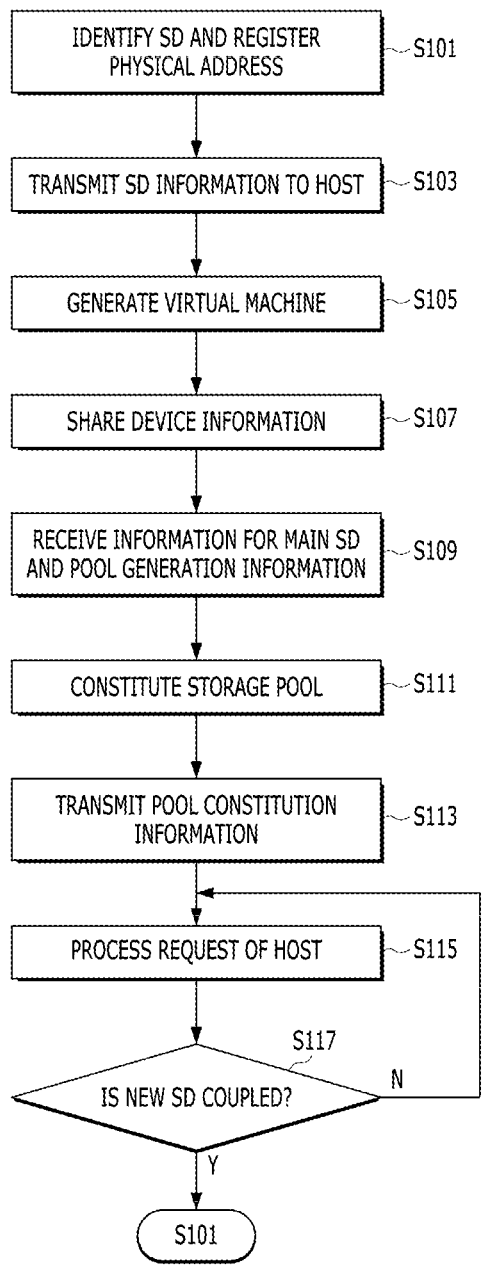
FIG. 8 is a flowchart illustrating a method of operating a storage device according to an embodiment of the present disclosure.

FIG. 8 is a flowchart illustrating a method of operating a storage device according to an embodiment.

Referring to FIG. 8, when the storage device 200 is employed in the storage system 1, 10, or 100, an ID and a physical address of the storage device 200 may be transmitted to the network switch 121 through the network interface 2103 and then registered in the network switch 121 (S101). The network switch 121 may transmit the ID and physical address of the storage device 200 to the host 110 (S103).

The storage virtualizer 2500 of the storage device 200 may generate at least one virtual machine and allocate a virtual address and a resource to the at least one virtual machine (S105). In an embodiment, the resource allocated to the virtual machine may be at least one or more partial regions of the nonvolatile memory device 2200-0 to 2200-L.

Accordingly, the storage device 200 (e.g., the plurality of storage devices 200-1 to 200-n employed in the storage system 1, 10, or 100) may form a virtual network. Each of the virtual machines included in the virtual network may be managed through virtual machine information. The virtual machine information may include a virtual machine ID, a virtual address of the virtual machine, and capacity for an ID of the nonvolatile memory device 2200-0 to 2200-L allocated to the virtual machine.

The storage virtualizer 2500 of the storage device 200 may broadcast device information through the virtual network so that the storage devices 200 (e.g., the plurality of the storage devices 200-1 to 200-n) may share device information with each other (S107).

The host 110 may determine, select, or designate any one of the storage devices 200-1 to 200-n as a main storage device and transmit a storage pool generation condition to the main storage device (S109). Accordingly, the storage virtualizer 2500 of the main storage device may generate or establish a storage pool based on the storage pool generation condition transmitted from the host 110 and the shared device information (S111). The storage pool may include at least one storage device 200-1 to 200-n or at least one data storage device 2200 of the at least one storage devices 200-1 to 200-n.

When the storage pool is generated or established, the main storage device may transmit storage pool generation information to the host 110 (S113). In an embodiment, the storage pool generation information may include a storage pool ID, a virtual machine ID for the storage pool, a virtual address for the virtual machine, and an ID and capacity of the nonvolatile memory device 2200-0 to 2200-L, which provide a memory resource.

The ID and physical address of the main storage device may be mapped to the storage pool ID, the ID for the virtual machine forming the storage pool, and the virtual addresses of the virtual machines generated in the main storage device and then registered in the network switch 121.

The host 110 may identify the storage pool based on the storage pool ID. As the host 110 transmits a request to the main storage device through the network switch 121, the main storage device may process the request in cooperation with a sub storage device (S115).

In an embodiment, the storage system 1, 10, or 100 may monitor whether or not a new storage device is added (S117). When the new storage device is added (S117: Yes or Y), the storage system 1, 10, or 100 may register the new storage device in the host 110 and perform a series of processes S101 to S113 for generating or establishing the storage pool by sharing the device information. When the new storage device is not added (S117: No or N), the storage system 1, 10, or 100 may monitor whether or not the request is transmitted from the host 110 and process the request (S115).

In an embodiment, the added storage device may not be incorporated into the storage pool and may be managed in a standby state.

In an embodiment, the storage device 200 may determine whether or not data distribution is necessary by monitoring a state of the storage device 200. When the data distribution is necessary, the storage device 200 may serve as the source storage device to select at least one target storage device based on the device information of the other storage devices. The source storage device may select data to be distributed, e.g., distribution target data, transmit the distribution target data to the target storage device, and store a position of distributed data in a distribution data management table.

Figure 9:
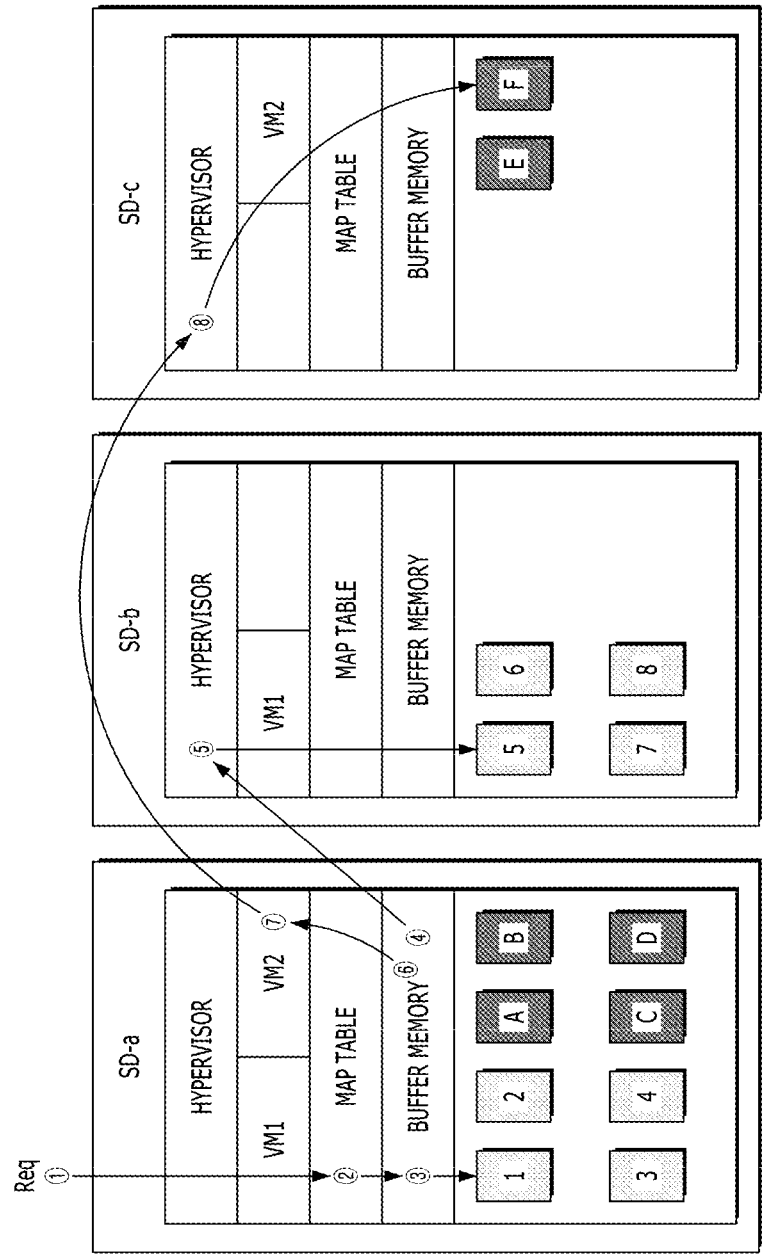
FIG. 9 is a diagram illustrating a request processing method of a storage system according to an embodiment of the present disclosure.

FIG. 9 is a diagram illustrating a method of processing requests in a storage system according to an embodiment.

When the host 110 transmits a request packet Req to any one of virtual addresses of virtual machines generated in a main storage device SD-a (①), the hypervisor 2501 of the main storage device SD-a may extract destination information, such as a storage pool ID and a virtual address from a header part of the request packet.

The hypervisor 2501 of the main storage device SD-a may extract a logical address and a command from a body part of the request packet and acquire physical access information by referring to the map table 2507 based on the extracted logical address (②). In an embodiment, the extracted command may be a write command. The physical access information acquired from the map table 2507 may be a virtual address of a virtual machine included in a storage pool, which is set as a destination, and a physical address of a nonvolatile memory device allocated to the virtual machine. Further, the hypervisor 2501 may temporarily store write data extracted from the body part in a buffer memory (③).

In an embodiment, when the physical access information is a physical address of a nonvolatile memory device allocated to a first virtual machine VM1 of the main storage device SD-a, which receives the request packet, the first virtual machine VM1 of the main storage device SD-a may store buffered write data in a memory block 1 of the corresponding storage pool.

In an embodiment, when the virtual address included in the physical access information is a physical address of a nonvolatile memory device allocated to a first virtual machine VM1 of a sub storage device SD-b, the first virtual machine VM1 of the main storage device SD-a may transmit the buffered write data to the hypervisor 2501 of the sub storage device SD-b (④) and the first virtual machine VM1 of the sub storage device SD-b may store transferred data in a memory block 5 (⑤).

In an embodiment, when the virtual address included in the physical access information is a physical address of a nonvolatile memory device allocated into a second virtual machine VM2 of a sub storage device SD-c, the first virtual machine VM1 of the main storage device SD-a may transmit the buffered write data to the hypervisor 2501 of the sub storage device SD-c (⑦) through a second virtual machine VM2 generated in the main storage device (⑥). A second virtual machine VM2 of the sub storage device SD-c may store transferred data in a memory block F (⑧).

Figure 10:
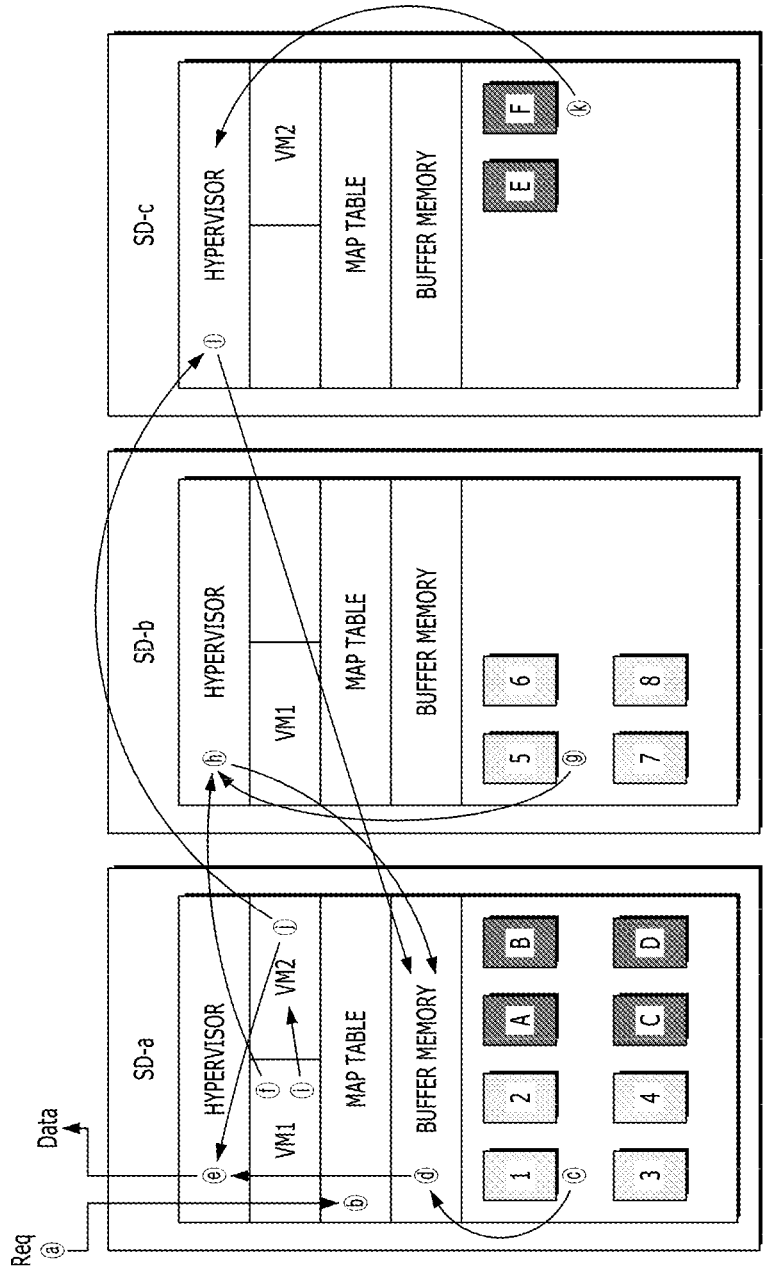
FIG. 10 is a diagram illustrating request processing in a storage system according to an embodiment of the present disclosure.

FIG. 10 is a diagram illustrating a method of processing a request in a storage system according to an embodiment.

As the host 110 transmits a request packet Req to any one of virtual addresses of virtual machines generated in the main storage device SD-a (ⓐ), the hypervisor 2501 of the main storage device SD-a may extract destination information, for example, a storage pool ID and a virtual address from a header part of the request packet. The hypervisor 2501 of the main storage device SD-a may extract a logical address and a command from a body part of the request packet and acquire physical access information by referring to the map table 2507 based on the extracted logical address (ⓑ). In an embodiment, the extracted command may be a read command.

The physical access information acquired from the map table 2507 may be a virtual address of a virtual machine included in a storage pool, which is set as a destination, and a physical address of a nonvolatile memory device allocated into the virtual machine.

In an embodiment, when the physical access information is a physical address of a nonvolatile memory device allocated to the first virtual machine VM1 of the main storage device SD-a, which receives the request packet, the first virtual machine VM1 of the main storage device SD-a may temporarily store data, which is read out from the memory block 1 (ⓒ), in the buffer memory (ⓓ) and then transmit the temporarily stored data to the host (ⓔ).

In an embodiment, when the virtual address included in the physical access information is a physical address of a nonvolatile memory device allocated to the first virtual machine VM1 of the sub storage device SD-b, the first virtual machine VM1 of the main storage device SD-a may transmit a read request to the hypervisor 2501 of the sub storage device SD-b (ⓕ) and the first virtual machine VM1 of the sub storage device SD-b may store data, which is read out from the memory block 5 (ⓖ), in the buffer memory of the main storage device SD-a through the hypervisor 2501 (ⓗ). Accordingly, the first virtual machine VM1 of the main storage device SD-a may provide buffered read data to the host (ⓔ).

In an embodiment, when the virtual address included in the physical access information is a physical address of a nonvolatile memory device allocated to the second virtual machine VM2 of the sub storage device SD-c, the first virtual machine VM1 of the main storage device SD-a may transmit the read request to the hypervisor 2501 of the sub storage device SD-c (ⓘ) through the second virtual machine VM2 of the main storage device SD-a (ⓙ).

The hypervisor 2501 of the sub storage device SD-c may store data, which is read out from the memory block F(⟨k⟩) based on the physical access information, in the buffer memory of the main storage device (①). Accordingly, the main storage device SD-a may provide the buffered read data to the host.

Figure 11:
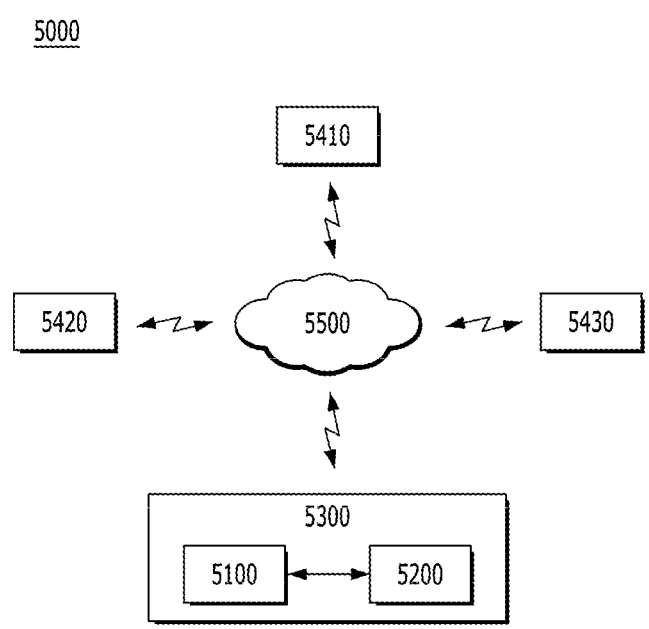
FIG. 11 is a diagram illustrating a network system including a data storage device according to an embodiment of the present disclosure.

FIG. 11 is a diagram illustrating a network system 5000 including a data storage device, in accordance with an embodiment. Referring to FIG. 11, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the memory system 10 shown in FIG. 1.

The above described embodiments of the present invention are intended to illustrate and not to limit the present invention. Various alternatives and equivalents are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. A storage system comprising:
    a plurality of storage devices coupled to at least one host through a network and configured to form a virtual network of virtual machines generated when the plurality of storage devices are coupled to the network,
    wherein each of the plurality of storage devices allocates memory resources to the virtual machines and shares device information for the plurality of storage devices through the virtual machines,
    wherein the at least one host:
        selects from the plurality of storage devices a main storage device, and
        transmits a storage pool generation condition to the main storage device that comprises a number of storage pools and a capacity of each storage pool,
    wherein the main storage device generates at least one storage pool using the memory resources allocated to each of the virtual machines based on the shared device information and the storage pool generation condition; and
    wherein the device information of each of the plurality of storage devices comprises hardware information and software information of the corresponding storage device.

2. The storage system of claim 1, wherein the at least one host is coupled to the main storage device through a physical network switch and the plurality of storage devices are coupled to each other through a virtual network switch to which the virtual machines are coupled.

3. The storage system of claim 1, wherein each of the plurality of storage devices generates virtual machines corresponding to the number of storage pools and assigns unique virtual addresses to the virtual machines.

4. The storage system of claim 3, wherein the at least one host accesses the at least one storage pool using virtual addresses of virtual machines generated in the main storage device.

5. The storage system of claim 1:
    wherein the hardware information is configured to include a remaining storage capacity of the storage device, a number of bad blocks, temperature, or lifespan; and
    wherein the software information is configured to include a busy degree of the storage device, a number of requests being processed or being in a standby state, a requested request pattern, or a requested data pattern.

6. The storage system of claim 1, further comprising:
    a baseboard management controller configured to manage the plurality of storage devices,
    wherein each of the plurality of storage devices transmits the device information to the baseboard management controller as the plurality of storage devices are coupled to the storage system.

7. A storage device, coupled to at least one host through a network, the storage device comprising:
    a controller; and
    a data storage device configured to write and read data according to control of the controller;
    wherein the controller includes:
        a network interface configured to couple the storage device to the network and communicate with the at least one host;
        a converter configured to perform conversion between a communication protocol of the network interface and a communication protocol of the storage device;
        a storage interface configured to provide a communication channel between the controller and the data storage device; and
        a storage virtualizer configured to:
            allocate a memory resource to at least one virtual machine that is generated as the storage device is coupled to the network;
            share device information of the plurality of storage devices through the at least one virtual machine; and
            generate at least one storage pool requested by the at least one host using the memory resource allocated to the at least one virtual machine based on the shared device information and a storage pool generation condition comprising a number of storage pools and capacity for each storage pool,
    wherein the device information of each of the plurality of storage devices comprises hardware information and software information of the corresponding storage device.

8. The storage device of claim 7, wherein the storage device is coupled to the at least one host through a physical network switch and is coupled to other storage devices through a virtual network switch to which the at least one virtual machine is coupled.

9. The storage device of claim 7, wherein the storage virtualizer generates virtual machines corresponding to the number of storage pools and assigns unique virtual addresses to the virtual machines.

10. The storage device of claim 9, wherein the at least one host accesses the at least one storage pool using the virtual addresses of the virtual machines.

11. The storage device of claim 7,
    wherein the hardware information is configured to include a remaining storage capacity of the storage device, a number of bad blocks, temperature, or lifespan; and wherein the software information is configured to include a busy degree of the storage device, a number of requests being processed or being in a standby state, a requested request pattern, or a requested data pattern.

12. The storage device of claim 7, wherein the storage device is coupled to a baseboard management controller and transmits the device information to the baseboard management controller.

13. A method of operating a storage system including a plurality of storage devices that are coupled to at least one host through a network, the method comprising:
generating at least one virtual machine when the plurality of storage devices are coupled to the network via each of the plurality of storage devices, wherein the plurality of storage devices form a virtual network of the virtual machines;
allocating a memory resource to the at least one virtual machine via each of the plurality of storage devices;
sharing device information of other storage devices through the virtual machines via each of the plurality of storage devices;
selecting, via the at least one host, from the plurality of storage devices a main storage device; and
transmitting a storage pool generation condition to the main storage device that comprises a number of storage pools and a capacity of each storage pool,
wherein the main storage device generates at least one storage pool using the memory resource allocated to the at least one virtual machine based on the shared device information and the storage pool generation condition, and
wherein the device information of each of the plurality of storage devices comprises hardware information and software information of the corresponding storage device.

14. The method of claim 13, wherein the main storage device is coupled to the at least one host through a physical network switch and the plurality of storage devices are coupled to each other through a virtual network switch to which the virtual machines are coupled.

15. The method of claim 13, wherein generating the at least one storage pool includes:
generating virtual machines corresponding to the number of storage pools via each of the plurality of storage devices; and
assigning unique virtual addresses to the virtual machines via each of the plurality of storage devices.

16. The method of claim 15, further comprising:
accessing, via the at least one host, the at least one storage pool using virtual addresses of virtual machines generated in the main storage device.

17. The method of claim 13,
wherein the hardware information is configured to include a remaining storage capacity of the storage device, a number of bad blocks, temperature, or lifespan; and
wherein the software information is configured to include a busy degree of the storage device, a number of requests being processed or being in a standby state, a requested request pattern, or a requested data pattern.

18. The method of claim 13, wherein the storage system further includes:
a baseboard management controller configured to manage the plurality of storage devices,
wherein the sharing of the device information includes the plurality of storage devices transmitting the device information to the baseboard management controller when the plurality of storage devices are coupled to the storage system.

19. The method of claim 13, wherein sharing device information of other storage devices includes each storage device of the plurality of storage devices transmitting changed device information to the other storage devices when a variation of device information of that storage device is equal to or more than a set threshold value.

20. The storage system of claim 1, wherein each of the storage devices transmit changed device information to the other storage devices when a variation of the device information is equal to or more than a set threshold value.

* * * * *